(12) United States Patent
Vanegas et al.

(10) Patent No.: US 7,130,740 B2
(45) Date of Patent: Oct. 31, 2006

(54) METHOD AND APPARATUS FOR GENERATION OF REAL-TIME GRAPHICAL DESCRIPTIONS IN NAVIGATIONAL SYSTEMS

(75) Inventors: Martha Vanegas, Chandler, AZ (US); Rafael Saavedra, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 445 days.

(21) Appl. No.: 10/703,805

(22) Filed: Nov. 7, 2003

(65) Prior Publication Data
US 2005/0102095 A1    May 12, 2005

(51) Int. Cl.
*G01C 21/26* (2006.01)
(52) U.S. Cl. .................... 701/200; 340/995.1
(58) Field of Classification Search ............ 701/200, 701/211, 207–209; 340/995.1, 995.19, 995.2, 340/995.22, 995.27
See application file for complete search history.

(56) References Cited

U.S. PATENT DOCUMENTS

| | | | | |
|---|---|---|---|---|
| 4,357,593 A | * | 11/1982 | von Tomkewitsch | ....... 340/988 |
| 4,796,189 A | | 1/1989 | Nakayama et al. | |
| 5,121,326 A | | 6/1992 | Moroto et al. | |
| 5,191,532 A | | 3/1993 | Moroto et al. | |
| 5,913,918 A | * | 6/1999 | Nakano et al. | ............ 701/208 |
| 5,983,158 A | * | 11/1999 | Suzuki et al. | ............... 701/209 |
| 6,182,010 B1 | | 1/2001 | Berstis | |
| 6,321,158 B1 | * | 11/2001 | DeLorme et al. | ........... 701/201 |
| 2004/0167711 A1 | * | 8/2004 | Chen et al. | .................. 701/209 |

* cited by examiner

*Primary Examiner*—Gary Chin
(74) *Attorney, Agent, or Firm*—Philip H. Burrus, IV; Terri S. Hughes

(57) ABSTRACT

A method and apparatus for generating real-time, symbolic descriptions for a navigational system is provided. The method may be employed within a variety of devices, including in-vehicle navigation systems, cellular telephones and PDAs. The method takes geographical coordinates corresponding to an oncoming maneuver, like a right-hand turn at a four-way intersection for example, and transforms them into a set of two-dimensional, planar coordinates. The method then maps these planar coordinates atop a pie-shaped, radial grid, and allocates points to subdivisions of the grid by counting the number of points that fall within the grid. The method then generates a symbolic description of the maneuver to be performed by drawing an arrow running from the beginning of the maneuver to the end of the maneuver atop a predetermined, generic description of the intersection. This real-time, graphical maneuver description is then displayed on a screen to a user. The use of the radial grid eliminates the need of performing complex, angular calculations with a local processor, and further eliminates the need of storing large image files in local memory.

16 Claims, 14 Drawing Sheets

METHOD AND APPARATUS FOR GENERATION OF REAL-TIME GRAPHICAL DESCRIPTIONS IN NAVIGATIONAL SYSTEMS

BACKGROUND

1. Technical Field

This invention relates generally to mobile navigational systems, and more particularly to a method and apparatus for displaying real-time graphical descriptions of navigational elements on a mobile computational device to assist a user in navigation.

2. Background Art

Navigational systems are becoming more and more popular. Gone are the days of traveling with only the guidance of the stars. Today's traveler has access to sophisticated navigational equipment to help them journey from point A to point B. These systems, be they mounted in a vehicle or simply in a handheld device, employ sophisticated electronics like global positioning system (GPS) sensors to tell travelers who are unfamiliar with the local geography not only exactly where they are, but also how to get from a starting point to a destination point. Additionally, some navigational systems are capable of providing a driver with a visual map.

Prior art navigational systems typically operate as follows: The navigational unit generally has an interactive visual screen or buttons that allows a driver to enter a desired destination location. The navigation unit then turns to a memory or CD drive that keeps map data. A local computer processor generates textual directions (e.g., "Drive for one mile and then turn right . . . ", etc.) based on the map data and desired destination, and displays these directions, in addition to present latitude and longitude coordinates, on the screen.

These "self-contained" navigational systems require large, expensive memories and processors having local map data and map generation capabilities. Such memories and processors are often prohibitively expensive. Another problem with these systems relates to their textual output. A driver who takes the time to read a statement like " . . . . Continue along Peachtree Street for 2.4 miles and then bear left onto Piedmont Road for 0.34 miles . . . " runs the risk of diverting attention from the road, thereby risking having an accident.

Two recent developments in the field of navigational devices attempt to address these issues. The first improvement is that of server-based, networked navigational units. A server-based navigation system typically downloads map information to a navigation unit by a wireless communication, thereby eliminating the need to store detailed map information locally.

The second is that of using pictures instead of textual direction statements. For example, U.S. Pat. No. 6,182,010, issued to Berstis for example, teaches using a photographic image taken by a digital camera to represent given locations, like intersections for instance. Rather than displaying several lines of text on a screen, a digital image, either locally stored or downloaded from a server, is displayed on a screen. The prior art suggests that by downloading photographic images, the problems of large local memories and textual readouts may be eliminated.

Problems still remain with these prior art systems, however. The first problem with a photo image, downloading system is that photographic image files are quite large in size. Consequently, the local unit must still be capable of storing multiple, large images to properly update the screen. Additionally, this large amount of downloaded information may conflict with available transmission bandwidth, thereby slowing down the delivery of critical information. (Who wants to miss a turn because the unit is trying to download a large image file?) Finally, such systems still require excessive computations to be done by the navigation unit, increasing the complexity and cost of the navigation unit.

There is a need to reduce the computation complexity in a navigation unit. Reducing the computational complexity of the navigation unit reduces the cost of electronics required to perform vehicle navigation. Additionally, there is a need to decrease or minimize the amount of data transmitted to a navigation unit. Decreasing or minimizing the amount of data transmitted to the navigation unit allows the unit to respond quicker and reduces data usage and cost for the wireless communications. There is thus a need for an improved method and apparatus for generating real-time, graphical descriptions of navigational elements to aid a user in reading information from a navigational unit.

DETAILED DESCRIPTION OF THE INVENTION

Figure 1:
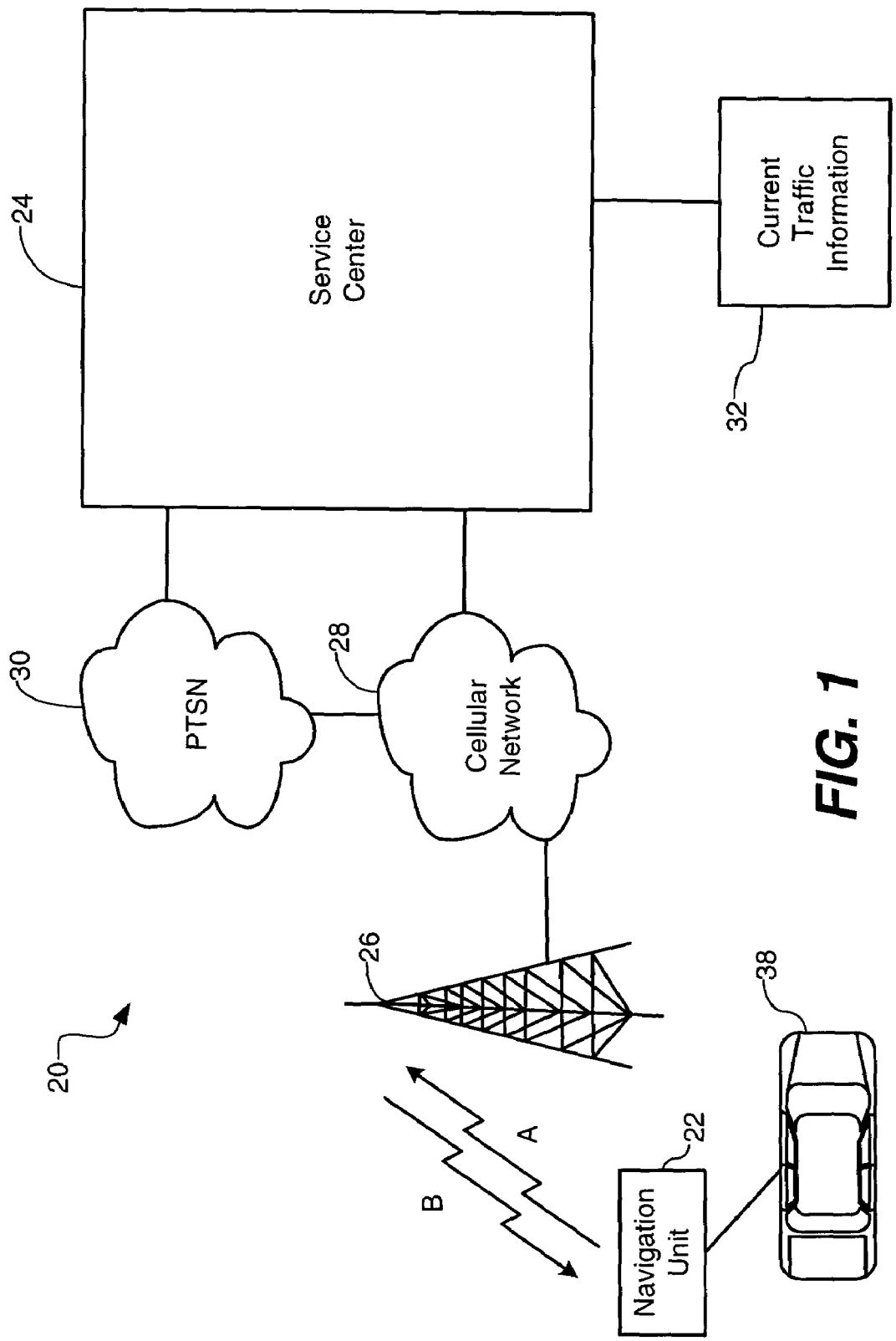
FIG. 1 is a top-level block diagram of one embodiment of a navigation system of the present invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

To reduce both the amount of memory and local processing power required to display graphical navigational information, this invention provides a method and apparatus to generate symbolic descriptions of navigational elements, like intersections for example. The invention eliminates the need for large memories or extensive calculations, thereby allowing the method to be implemented in devices like cellular telephones, in addition to in-vehicle navigational systems.

In one embodiment, a local navigational unit receives information relating to an oncoming route maneuver from a remote server. The route maneuver may be as simple as turning right at the next intersection, or may be more complex, like entering an on-coming round about and exiting the round about at the third of five possible exits. The information received includes several successive points of geographical latitude, longitude and altitude, as well as a code that identifies the type of approaching intersection. The local navigational unit then performs a simple, linear transformation to convert the three dimensional coordinates into two dimensional coordinates.

The system then maps these two dimensional coordinates onto a radial, pie-shaped grid that is divided twice. The first division cuts the pie into 12 slices, with the second division cutting each of the 12 slices into 3 smaller slices. The two dimensional coordinates are then mapped onto the pie-shaped grid. Mapping eliminates the need of the processor to perform complex calculations, like angles and distances between sets of two dimensional coordinates.

By counting the number of entry and exit points that fall in each slice, the local navigational unit is able to determine into which slice the entry route and exit route fall. Using this entry and exit route information, in conjunction with the intersection type code, the local navigational unit is able to generate a real-time, symbolic description of the route maneuver for display on a screen to the user.

By altering the number of slices in the pie-shaped grid, the invention allows the rotation and precision of the route maneuver to be adjusted to the processing capabilities of the local navigational unit. Small processors may employ fewer slices, while more powerful processors may employ more slices.

To begin with some background information, palm-top and in-vehicle navigational systems are well known in the art. For example, U.S. Pat. Nos. 5,121,326 and 5,191,532 illustrate representative systems. These navigational systems have evolved over the years. While the navigational systems were initially self contained units, they have evolved to become sophisticated, networked communications systems involving a host server and a local navigational unit.

As an example, for a modest price, one may purchase a 2003 Honda Accord® sedan with its Honda Satellite-Linked Navigational System™ accessory, known as the "Navi System". The Navi System responds to voice commands and allows one to travel across the United States without a map. The Navi Systems even includes directions to seven million points of interest across the US.

As the symbolic route guidance description generator of the present invention may be employed with a variety of navigational systems, for discussion purposes, one exemplary embodiment of a networked navigational system will be described herein, as illustrated in FIG. 1. It will be clear to those of ordinary skill in the art that the invention is not limited to this particular system.

Referring now to FIG. 1, illustrated therein is a top-level block diagram of one navigational system 20 with which the present invention may be used. Generally, the navigation system 20 includes a navigation unit 22 and a service center 24. The service center 24 and the navigation unit 22 are described further below in relation to FIGS. 2 and 5, respectively.

In the navigation system 20, the navigation unit 22 and the service center 24 may communicate with each other via wireless communications. The wireless communications are illustrated in FIG. 1 by communication arrows A and B. The communications between the navigation unit 22 and the service center 24 will now be described generally although a more detailed description is provided after the general discussion.

Generally, in one embodiment, the navigation unit 22 transmits its current location (or starting point) and desired location (or destination point) to the service center 24 via communication A. As shown in FIG. 1, in one embodiment, the communication A is a cellular wireless communication that is transmitted to a base station antenna 26, through a cellular network 28 and a public switched telephone network (PSTN) 30, and to the service center 24. The transmission of the destination point to the service center 24 may be a voice call to an operator at the service center 24 that is initiated by the user of the navigation unit 22. The starting point may be transmitted during the voice call or determined by a global positioning system (GPS) module in the navigation unit 22 and transmitted separately. Alternatively, the transmission of the starting point and destination point to the service center 24 may be a data transmission manually or otherwise entered by the user of the navigation unit 22.

Those of ordinary skill in the art, having the benefit of this disclosure, will appreciate that many possible wireless communication methods may be used for communications from the navigation unit 22 to the service center 24. In one embodiment, the communications are via a cellular wireless communication such as AMPS, CDMA, GSM or TDMA. The transmission from the navigation unit 22 to the service center 24 may also be made by other wireless communications such as a satellite communications.

In response to receiving the starting point and destination point from the navigation unit 22, the service center 24 selects a route and determines a variety of points along the route. While these points may include preparation points, warning points, instruction points, confirmation points, and other points, the service center 24 generates maneuver points to be transmitted to the navigation unit 22 for the generation of symbolic descriptions in accordance with the invention.

The service center 24 has a server that uses digital map data to select a route. The service center 24 may also be configured to receive current traffic information 32 from a service provider or other current traffic source. In that case, the selected route may also include a consideration for current traffic patterns. After selecting a route, the server then determines various points along the route to help instruct the user toward the destination point.

As shown in FIG. 1, in one embodiment, the communication B is a cellular wireless communication that is sent through the public switched telephone network (PSTN) 30 and cellular network 28 and transmitted by the base station antenna 26 to the navigation unit 22. Again, those of ordinary skill in the art, having the benefit of this disclosure, will appreciate that many possible wireless communication methods may be used for communications from the service center 24 to the navigation unit 22. In one embodiment, the communication is via a digital cellular wireless communication such as CDMA, GSM or TDMA. The transmission from the service center 24 to the navigation unit 22 may also be made by other wireless communication such as a satellite communications.

Generally, the navigation unit 22 consists of a wireless communication module and antenna for transmitting and receiving wireless voice and data communications to and from the service center 24. The navigation unit 22 further includes a microcomputer for performing the main functions of processing the various points received from the service center 24. The navigation unit 22 includes a screen for displaying information to a user.

Figure 2:
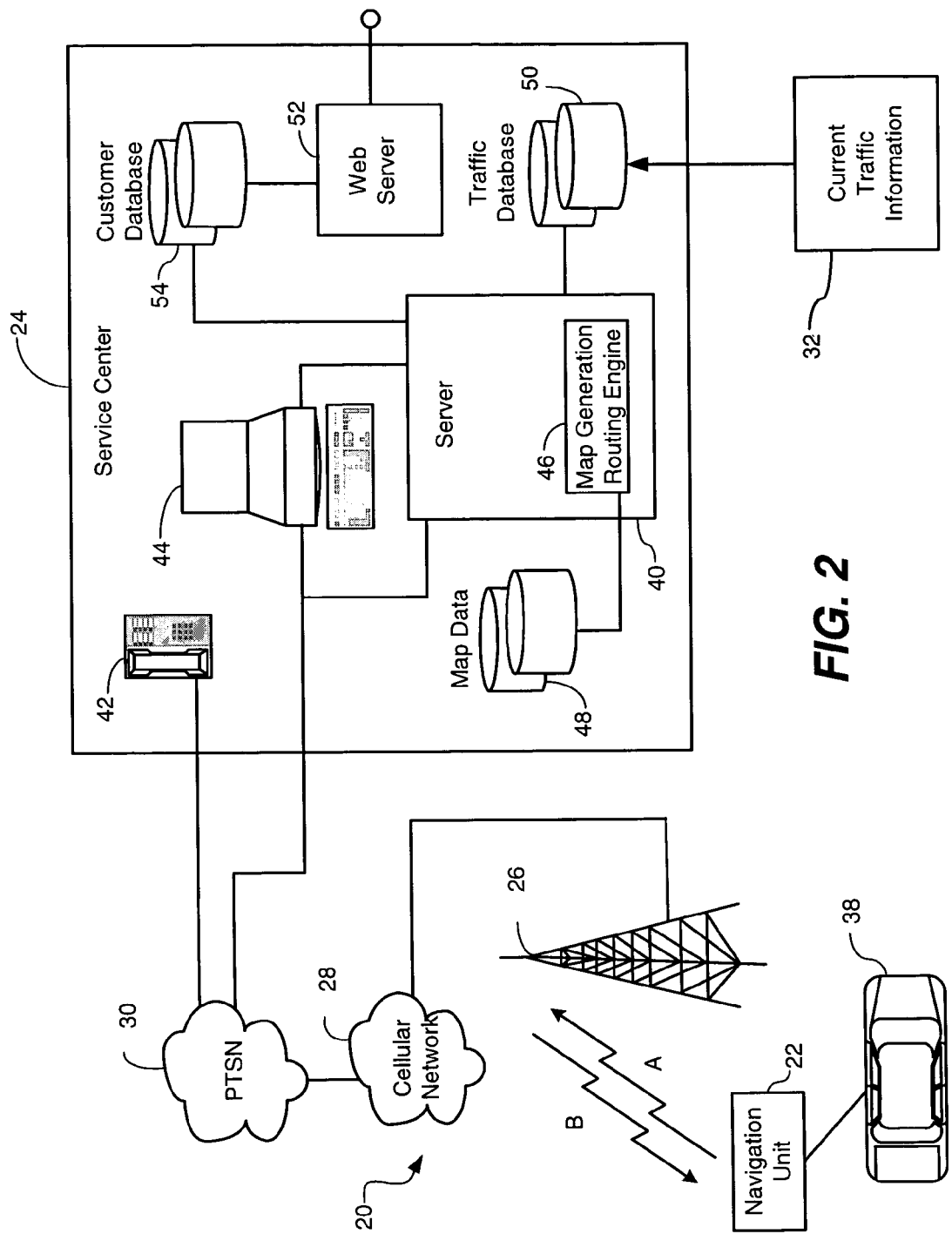
FIG. 2 is a block diagram of the navigation system in FIG. 1 showing further details of one embodiment of a service center of the system.

Referring now to FIG. 2, the service center 24 of the navigation system 20 will now be described in more detail. At the heart of the service center 24 is a server 40. The service center 24, through server 40, performs several functions including receiving the starting point and destination point, selecting a route based on the received locations, determining certain maneuver points along the selected route, and transmitting data associated with the determined points to the navigation unit 22.

As stated, one function of the service center 24 is to receive the starting point and destination point transmitted by the navigation unit 22. Accordingly, in one embodiment, the service center 24 may further include at least one telephone 42 and at least one computer terminal 44. In this embodiment, an operator at the service center 24 may use the telephone 42 to receive voice communications from the user of the navigation unit 22. During the voice communication, the user of the navigation unit 22 can provide the operator with the starting point and destination point. The operator may then enter, or otherwise input, the starting point and destination point into the computer terminal 46. In this embodiment, the server 40 receives the starting point and destination point from the computer terminal 46. Alternatively, in another embodiment, the navigation unit 22 may be configured to directly transmit the starting point and/or destination point to the server 40 via a digital transmission. For example, a GPS module may determine the starting point of the navigation unit 22 and a wireless communication device in the navigation unit 22 can digitally transmit that information to the server 40 using a cellular communication. The navigation unit 22 could also be configured to allow the user to type or otherwise manually enter the destination point. The entered destination point could be encoded and transmitted to the server 40 via a digital transmission.

Another function of the service center 24 is to select a route based on the received starting and destination points. The server 40 in the service center 24 uses a map generation routing engine 46 to select a route. The map generation routing engine 46 may be a separate component or integral to the server 40. The server 40 uses the map generation routing engine 46 to select a route based on the received starting and destination points. Connected to the map generation routing engine 46 is stored digital map data 48 that is used to select a route from the starting point to the destination point. The service center 24 may optionally be configured to receive current traffic information 32.

Figure 3:
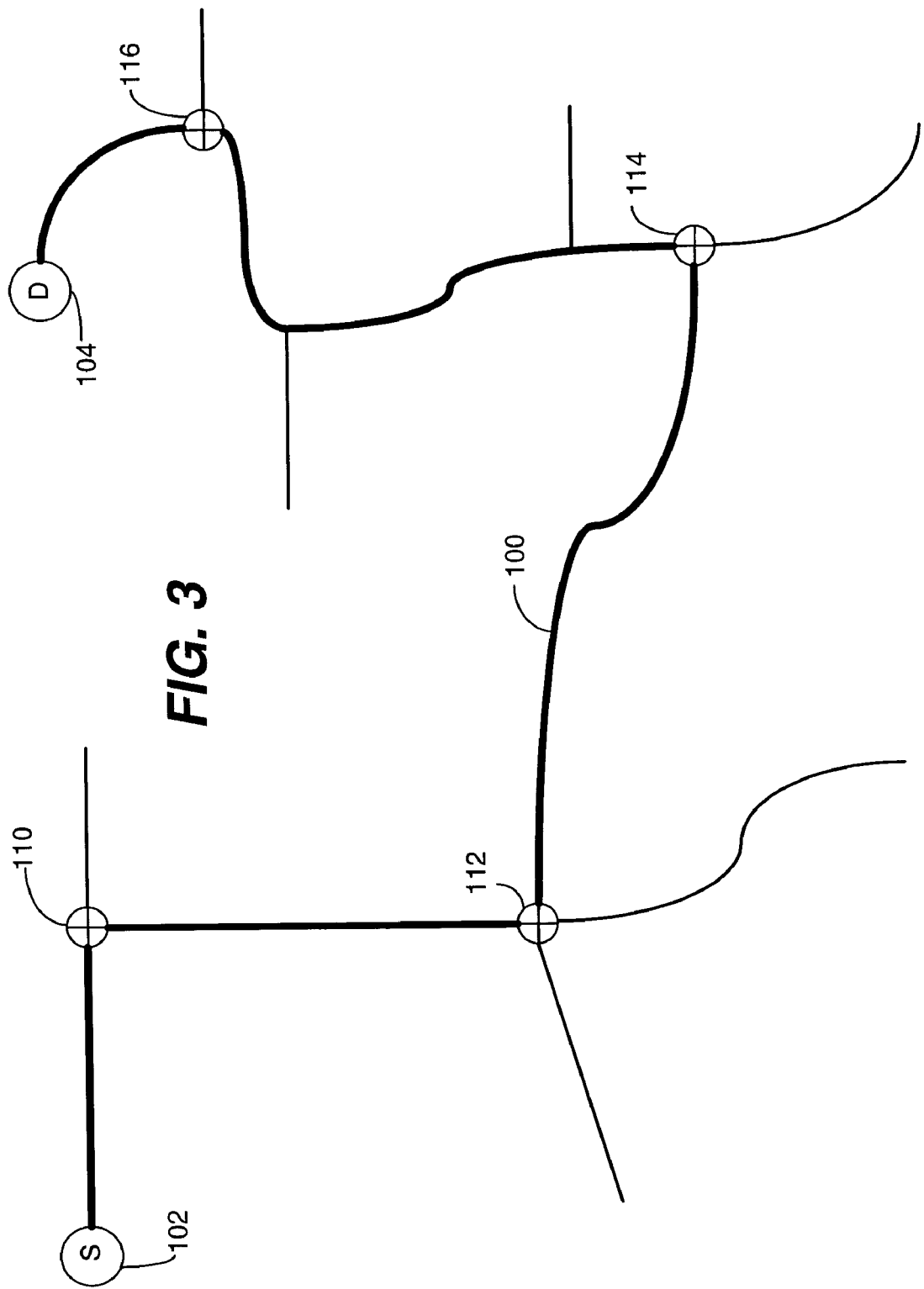
FIG. 3 is a map illustrating the selection by the service center of certain points along a route used in the navigation system of the present invention.

A further function of the service center 24 is to determine certain points after the route is selected. The details of these determined points by the server 40 are further explained with reference to FIG. 3. Referring now to FIG. 3, illustrated therein is a map having a dark line that represents a route 100 selected as described above. The selected route 100 extends from a starting point 102 to a destination point 104.

While many types of points may be generated by the server 40, the points of interest with respect to the present invention are the set of maneuver points 110,112,114,116 along the selected route 100. The maneuver points 110, 112, 114, 116 represent points along the selected route 100 where the user must make a maneuver, like a turn for example, to properly progress to the destination point 104. The maneuver points 110, 112, 114, 116 are downloaded to the navigation unit 22 when the route is downloaded.

Maneuvers traditionally occur at intersections for locales having structured roadways. It will be clear to those of ordinary skill in the art, however, that intersections would not be present for locales without roads. Assuming the presence of structured roadways for discussion purposes, the maneuver points 110,112,114,116 include data relating to the beginning of the maneuver point, the ending of the maneuver point and the type of intersection that will be encountered.

Figure 6:
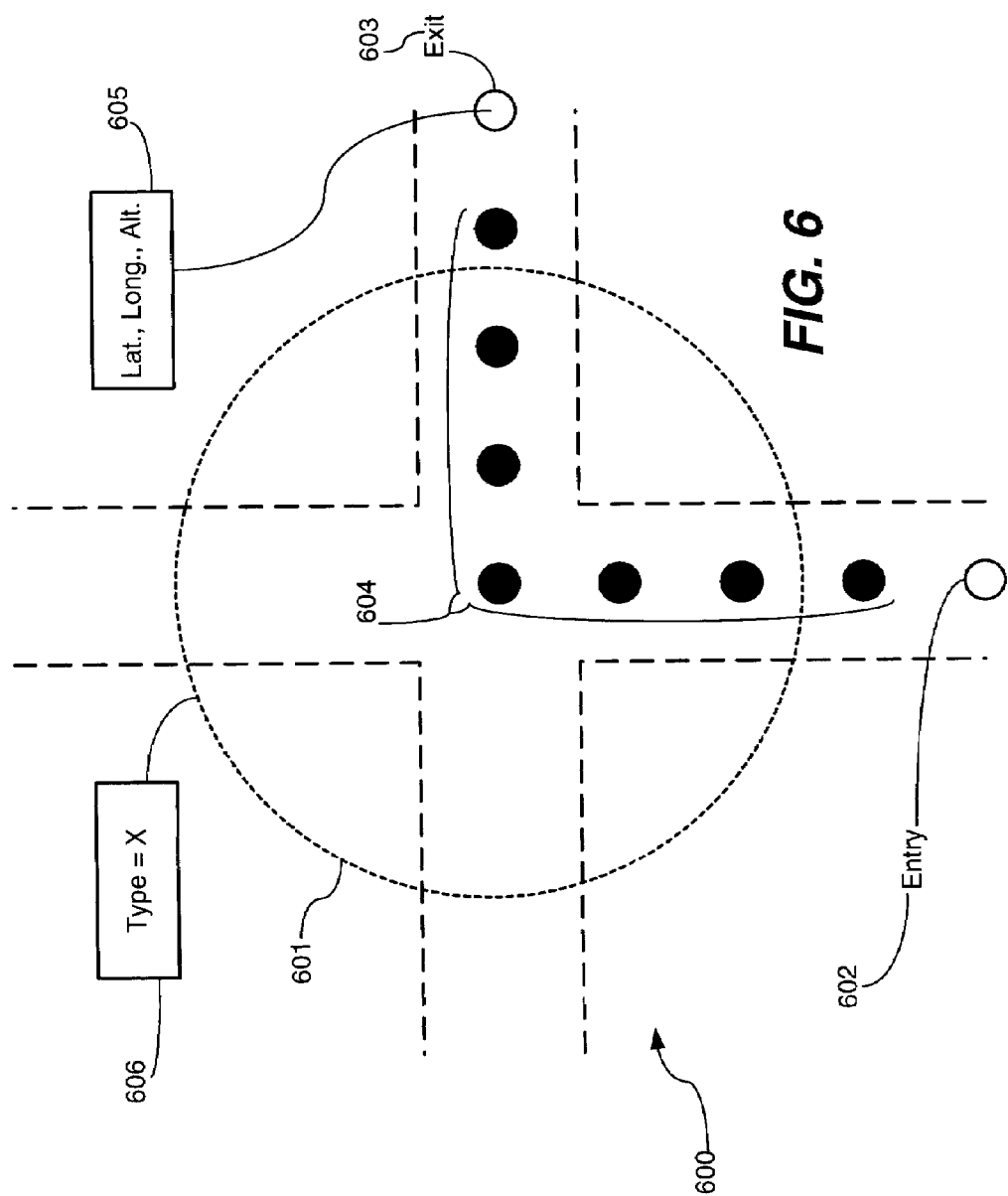
FIG. 6 illustrates an exploded view of a one particular maneuver point.

Referring briefly to FIG. 6, illustrated therein is an exploded view of a specific maneuver point 600, which could correspond to one of the maneuver points 110,112, 114,116 from FIG. 3. This particular maneuver point 600 relates to a four way intersection 601, with the exemplary maneuver being performed consisting of making a right hand turn.

For this particular maneuver, there exists an entry point 602 and an exit point 603. Both the entry point 602 and the exit point are transmitted from the server to the navigation unit at the beginning of the journey. The entry point 602 and exit point 603 form the base set of a plurality of points and generally comprise several pieces of geographical information, including a latitude coordinate, a longitudinal coordinate and an altitude coordinate. These points are represented by data set 605. The entry point 602 and exit point 603 may be the only points transmitted, or alternatively, there may be a plurality of points 604 tracing the maneuver disposed in between. Additionally, points associated with each of the possible entries or exits may be transmitted. In such scenario, the entry and exit points associated with the maneuver would include a special flag, thereby designating them as maneuver entry and exit points.

In addition to the geographical coordinates associated with the points, the server will also transmit a type code 606 that corresponds to one of a plurality of intersection types. In this exemplary embodiment, type code X 606 may correspond to a four-way intersection 601, while a different type code, perhaps type code Y, will correspond to another intersection, like a roundabout. Other possible intersections include three-way intersections, four-way intersections, five-way intersections, six-way intersections, clover leafs and exit/entry ramped intersections. As an alternative to transmitting a type code, the server may transmit a set of points that includes all possible entries and exits of the intersection. The navigational unit would then be able to determine the type of intersection by grid allocation, as is described below in the discussion of FIG. 8.

Figure 4:
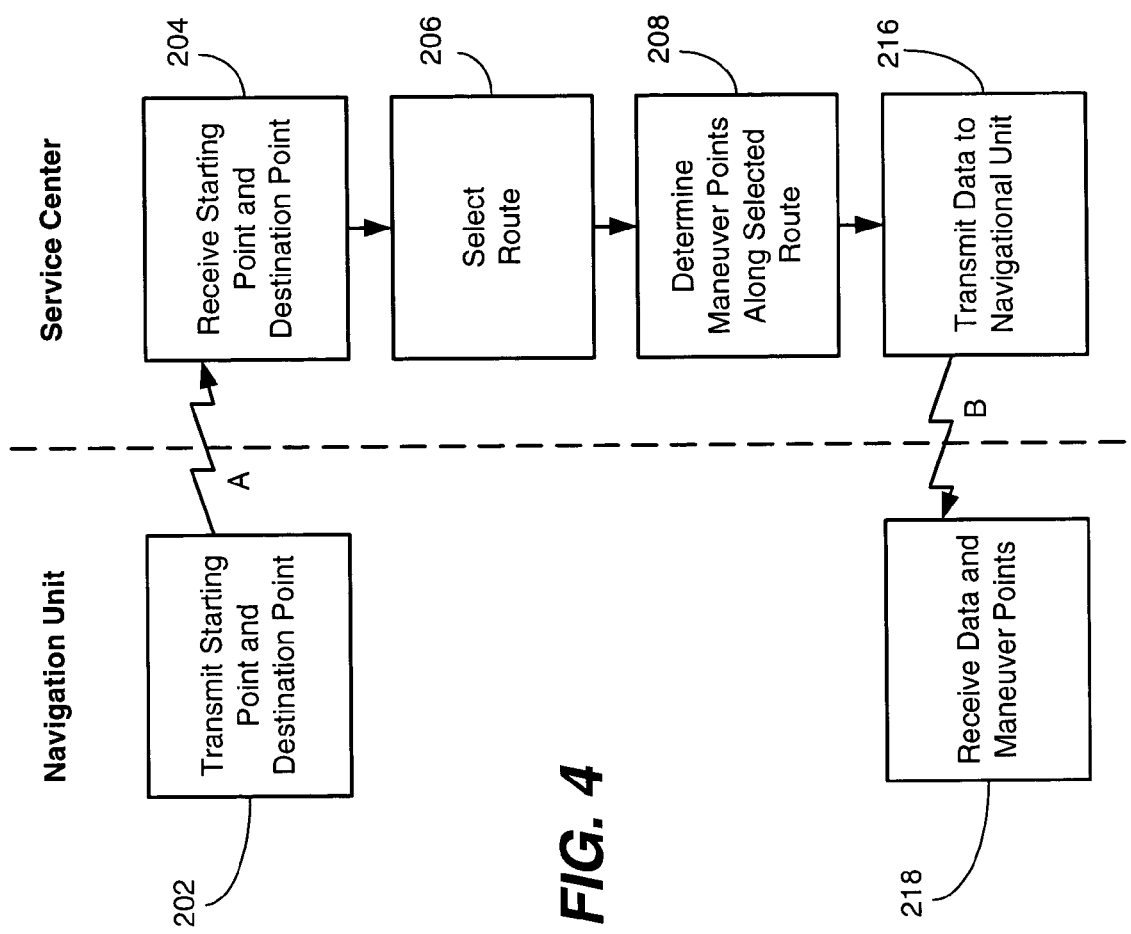
FIG. 4 is a flow diagram illustrating one embodiment of operations between the navigation unit and the service center in the navigation system of the present invention.

FIG. 4 illustrates a summary of the operation and interaction between the navigation unit 22 and the service center 24 in one embodiment of present invention. In block 202, the navigation unit 22 transmits a starting point and a destination point to the service center 24. This has been previously described as being either a voice call or a wireless data transmission. In block 204, the service center 24 receives the starting point and the destination point from the navigation unit 22. This has been previously described as being received by an operator and inputted to the server 40 or directed inputted to the server 40 by a digital transmission.

After the service center 24 receives the starting point and the destination point, in block 206, the service center 24 may select a route 100. In block 208, the service center 24 determines a set of maneuver points (such as points 110, 112, 114, 116) along the selected route 100. Those of ordinary skill in the art having the benefit of this disclosure will appreciate that selecting a route 100 (in block 206) could be merged or done in conjunction with the determination of the maneuver points.

After the maneuver points are determined and data associated with each point are generated; in block 216, the service center 24 transmits or sends the data associated with the maneuver points to the navigation unit 22. This may be done by digitally encoding the data and transmitting the data to the navigation unit 22 by a wireless communication. As explained above, the type of data transmitted for each point may include a string of three-dimensional coordinates representing the entry and exit of the maneuver, as well as the type of intersection to be encountered. In block 218, the navigation unit 22 receives the data for the points transmitted or sent by the service center 24.

Figure 5:
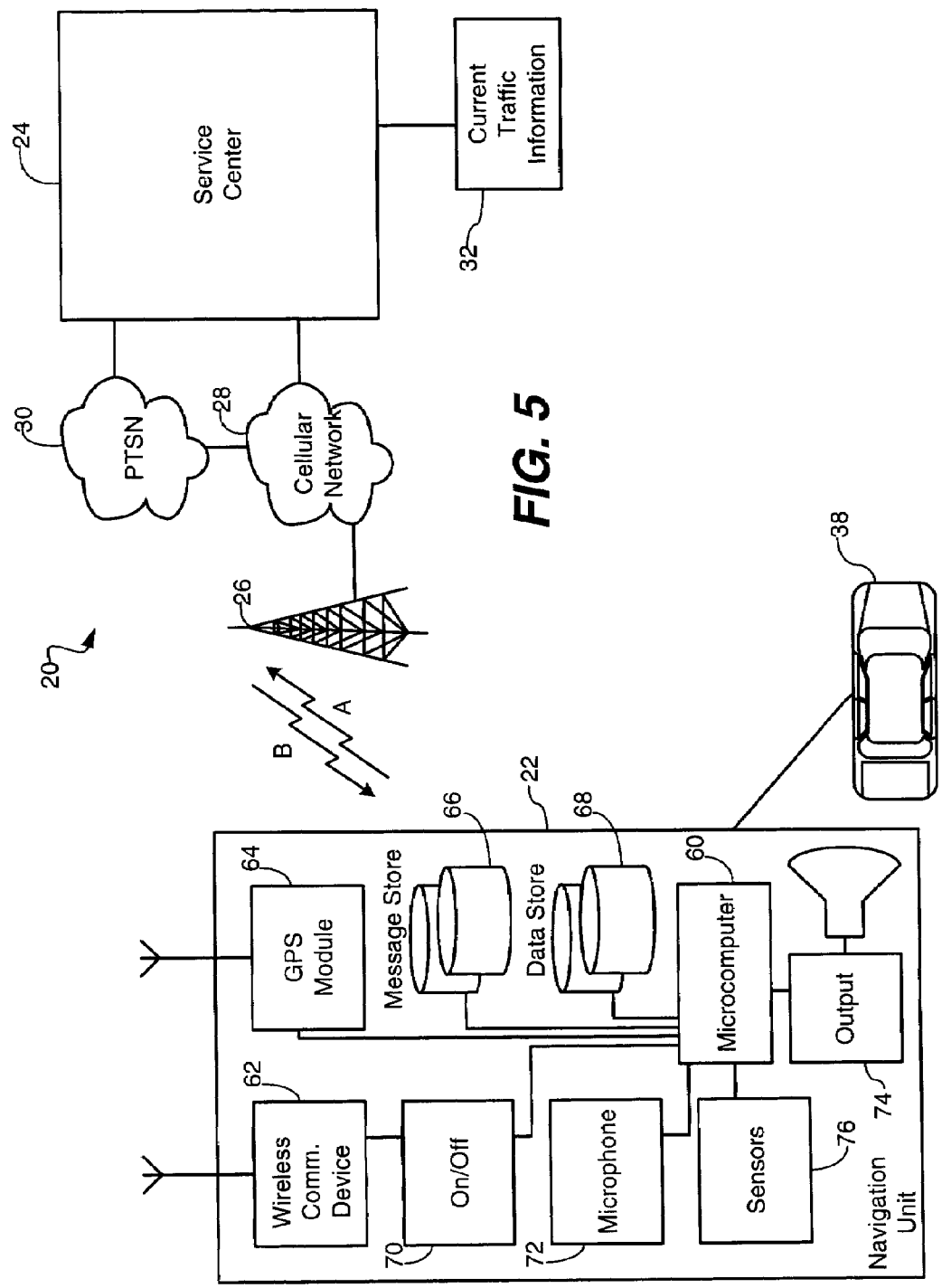
FIG. 5 is a block diagram of the navigation system in FIG. 1 showing further details of one embodiment of a navigation unit of the system.

Referring to FIG. 5, the navigation unit 22 will now be described in more detail. In one embodiment, the navigation unit 22 may be positioned in a vehicle 38, although the navigation unit described herein could be used in other ways such as in personal navigation systems in phones or PDAs. At the heart of the navigation unit 22 is a microcomputer 60. The navigation unit 22 may further include a wireless communication device 62, a GPS module 64, a memory 66, a memory 68 to store data on points downloaded from the service center 24, an on/off button 70 to activate/deactivate the system, and a microphone 72 and output 74 for hands-free operation.

In one embodiment, the wireless communication device 62 includes a transmitter to transmit cellular wireless communications such as AMPS, CDMA, GSM or TDMA. The wireless communication device 62 may also be configured to transmit by other wireless communications such as a satellite communication. The wireless communication device 62 includes a receiver to receive and decode the digital data associated with the points sent or otherwise transmitted by the service center 24. The receiver may be configured to receive digital cellular communications such as CDMA, GSM or TDMA. The receiver may also be configured to receive other types of wireless communications such as those transmitted by satellites.

The received data associated with each point is stored in a memory 68. As will be explained further below, the microcomputer 60 may then use the received and stored data in memory 68 to provide a meaningful navigation experience to the user of the navigation unit 22.

The navigation unit 22 may further include sensors 76 or inputs from various sensors already existing on the vehicle 38. The types of sensors 76 that may be applicable for the navigation unit 22 are a speed sensor and a direction or heading sensor. The information from vehicle sensors may be used in combination with the GPS module to confirm that the navigation unit 22 is properly traversing to the destination point.

The microcomputer 60 may have a processor that implements software stored in memory. In one embodiment, the data associated with each point may be sequentially stored in memory 68. In this context, the term "sequential" means that the points are stored in the order that the vehicle would travel to get to a particular destination point.

Figure 7:
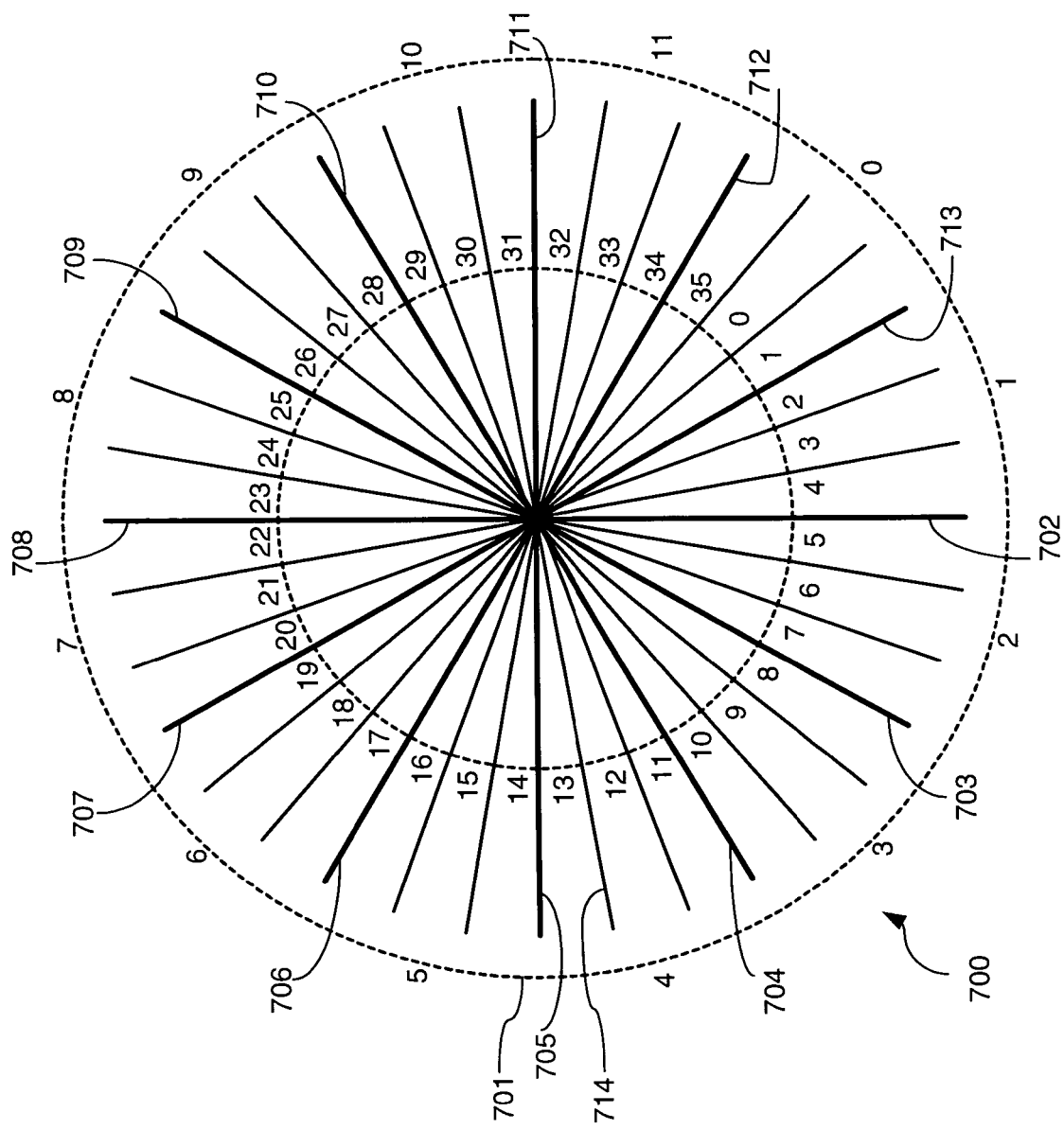
FIG. 7 illustrates one preferred embodiment of a radial grid in accordance with the invention.

Referring now to FIG. 7, illustrated therein is one preferred embodiment of a radial grid 700 in accordance with the invention. The use of the radial grid 700 will be described in detail below, while the geometry, layout and requirements of the radial grid 700 will be discussed here. In accordance with the invention, the radial grid 700 is provided to the navigational unit and is stored in non-volatile memory.

The radial grid 700 essentially comprises a daisy pattern having at least one group of subdivisions 701. In this exemplary embodiment, the subdivisions 701 are made of partitions 702–713 extending outward from the center of the grid. While 12 partitions 702–713 have been used, it will be clear that this number may be increased or decreased depending upon the desired accuracy. A preferred range for the first set of subdivisions is between 1 and 32 divisions.

When more accuracy is desired, a second set of subdivisions 714 may be employed by adding additional partitions to the first set of subdivisions 701. In this exemplary embodiment, each of the first set of subdivisions 701 has been divided into three smaller subdivisions 714, yielding a total of 36 overall subdivisions. A preferred range for the second set of subdivisions is between 3 and 112. As will be shown below, the radial grid 700 allows a microcomputer to generate a symbolic description of the navigational path without having to calculate complex angles between the geographic coordinates. Such calculation may slow a small microprocessor down so much that it falls behind the user as he progresses through his journey. The elimination of this calculation will facilitate real-time symbolic description generation.

Figure 8:
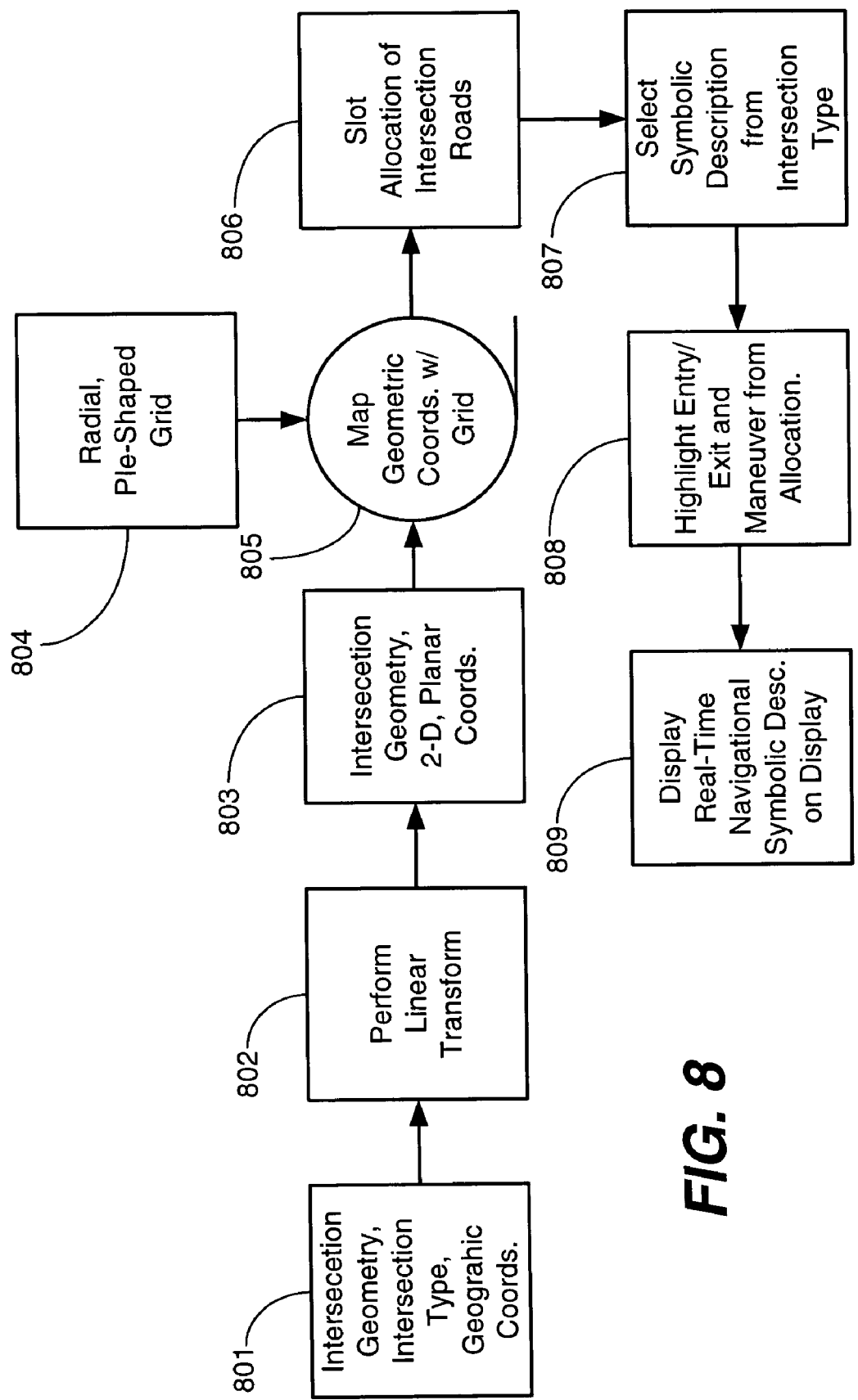
FIG. 8 illustrates a block diagram overview of a symbolic generation method in accordance with the invention.

Referring now to FIG. 8, illustrated therein is a block diagram overview of a symbolic generation method in accordance with the invention. At step 801, the navigational unit receives and stores the data relating to the maneuver point, including the geographic coordinates and intersection type as described in the discussion of FIG. 6, in a plurality of registers in memory. The microcomputer of the navigational unit then performs a linear transform on the geographical coordinates. The transform step 801 converts the plurality of geographical coordinates to a plurality of two-dimensional, planar coordinates.

At step 804, the microcomputer retrieves the radial grid from a plurality of registers in memory as described in the discussion of FIG. 7. At step 805, the microcomputer maps the plurality of planar coordinates with the radial grid, by translating the center of the radial grid (element 702 of FIG. 7) to the origin of the planar, two-dimensional coordinate grid.

At step 806, the microcomputer performs a slot allocation of the plurality of planar coordinates. Essentially, the microcomputer counts the number of entry and exit planar coordinates, or alternatively, coordinates that are flagged as entry and exit coordinates of the maneuver, that fall into each subdivision of the radial grid. The subdivisions with the highest numbers of entry/exit points represent the subdivisions through which the user will travel. As the microcomputer now knows which subdivisions the entry and exit point fall into, the microcomputer instantly selects which subdivision represents the entry into the intersection, and which subdivision represents the exit of the subdivision. The allocation step 806 is important, in that even simple microcomputers, like those found in cellular phones for example, can quickly count the number of planar coordinates that fall into each subdivision. Such an allocation process is simpler and faster than computing complex angles.

At step 807, the microcomputer selects a generic symbolic description of the intersection from a plurality of predetermined symbolic intersection descriptions stored in a plurality of memory registers, the selection being based upon the intersection type code transmitted to the navigational unit by the server. At step 808, the microcomputer applies the navigational description by highlighting the entry and exit roads of the generic symbolic description, thereby generating a real-time, navigational symbolic description of the intersection. The entry and exit are highlighted by selecting the roads on the generic symbolic description that correspond to the entry and exit subdivisions of the radial grid. At step 809, the real-time, navigational subdivision is displayed to the user on a screen.

Figure 9:
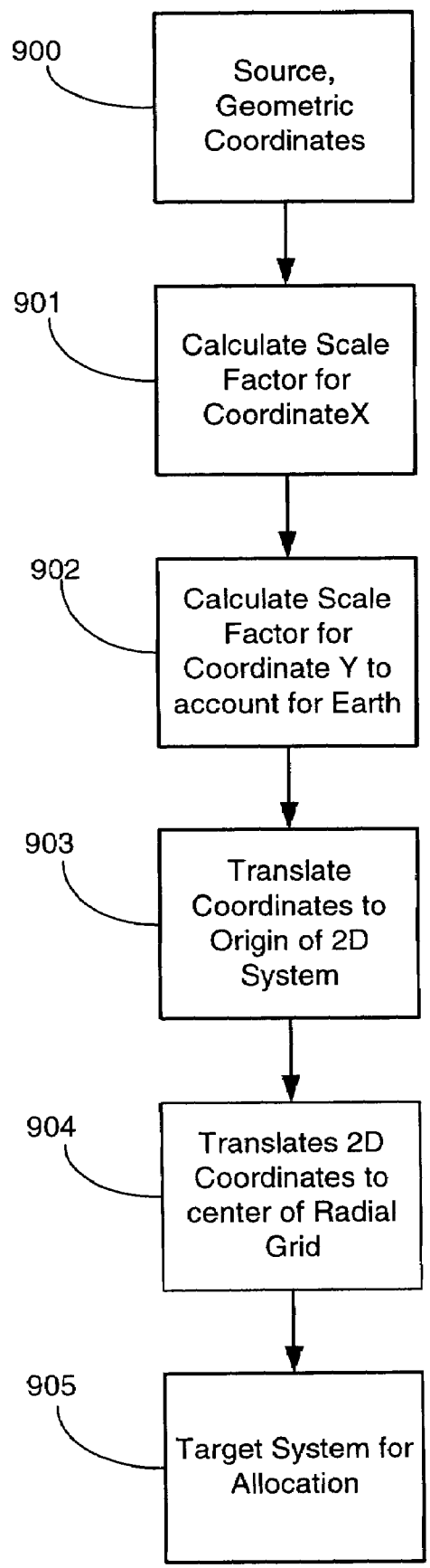
FIG. 9 illustrates one preferred method of executing the transform shown in FIG. 8.

Referring now to FIG. 9, the transform represented by step 802 of FIG. 8 will be described in further detail. Recall from above that the coordinates transmitted to the navigational unit by the server comprise latitude, longitude and altitude, and thus consist of a set of three dimensional coordinates. To be mapped with the two-dimensional radial grid, these geographic coordinates must be converted into planar coordinates.

At step 901, the microcomputer retrieves the geographic coordinates. The microcomputer disregards the altitude coordinate, and employs only the latitude and longitude coordinates in the transformation. At step 902, the microcomputer calculates a scaling factor for the latitude coordinate. This scaling factor is a variable that may be changed based upon the lengths of the entry, exit, and other roads to and from the intersection, as well as for the type of intersection.

By way of example, for a four-way intersection, a default constant may be 1600 meters. However, if the entry, exit or other roads are longer than this default value may be increased. Thus, through the scaling, the entry point transmitted from the server to the navigational unit becomes a string of points extending a distance equal to the scaling factor along the entry. The same is true for the exit point.

As another example, the scaling for roundabouts is done a bit differently. Since a conventional roundabout has entry, exit and a center loop, the diameter of the loop must also be considered. Exemplary default values for the roundabout scaling factors would be 1600 meters plus thrice the diameter of the roundabout, which roughly estimates the distance around the roundabout.

At step 903, the latitude coordinate is scaled by a factor that depends upon the curvature of the earth. This latitude scaling factor reduces the amount of error that occurs when the planar coordinates are mapped with the radial grid. Once step 903 is complete, the geographical coordinates have been effectively converted to planar coordinates.

At step 904, the planar coordinates are transformed to the origin of their system. This translation to the origin facilitates the translation and correlation, at step 905, of the origin of the planar coordinate system to the center of the radial grid. Once step 905 is completed, the microcomputer may begin the slot allocation of planar points on the radial grid as described with respect to step 806 of FIG. 8.

Figure 10:
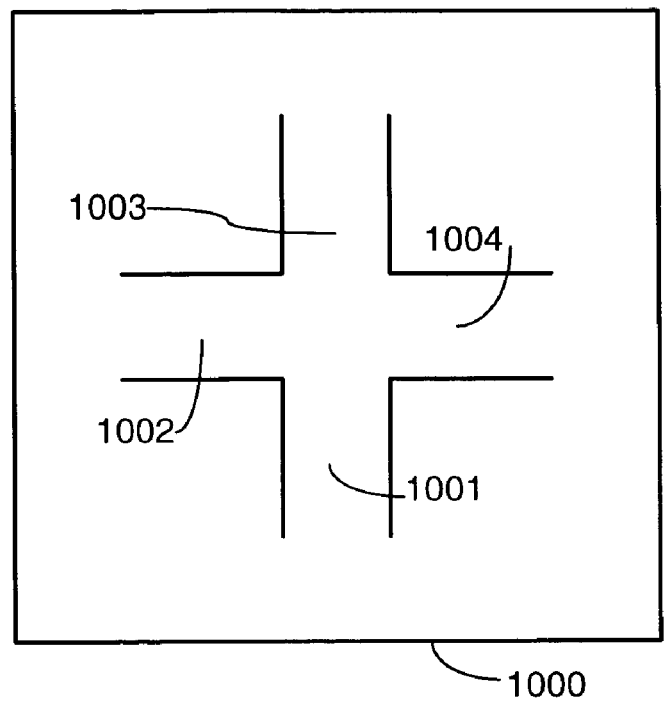
FIG. 10 illustrates an exemplary symbolic description of a four-way intersection in accordance with the invention.
Figure 11:
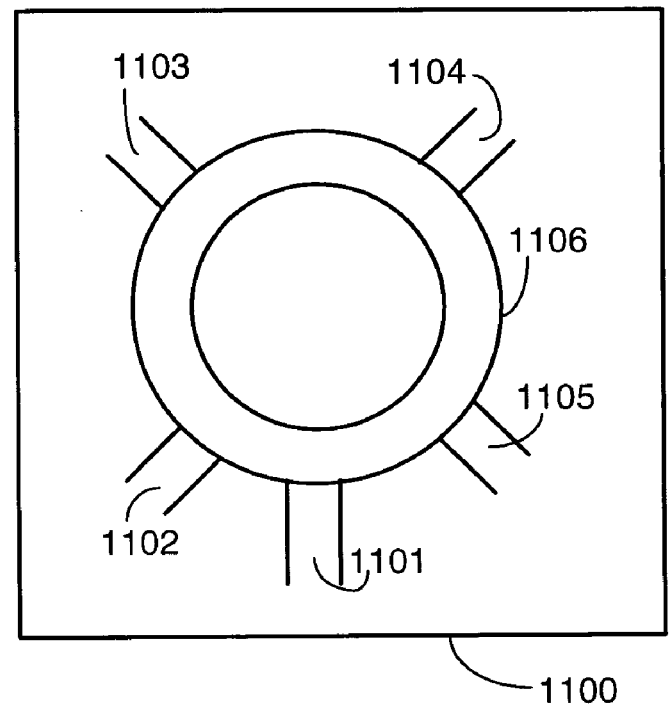
FIG. 11 illustrates an exemplary symbolic description of a roundabout in accordance with the invention.

Referring now to FIGS. 10–11, illustrated therein are exemplary predetermined symbolic intersection descriptions. FIG. 10 illustrates an exemplary four-way intersection description 1000, and FIG. 11 illustrates an exemplary roundabout description 1101. With respect to FIG. 10, roads 1001,1002,1003,1004 represent the potential entries and exits of the intersection. With respect to FIG. 11, roads 1101,1102,1103,1104 represent the potential entries and exits, while loop 1106 represents the roundabout itself.

Figure 12:
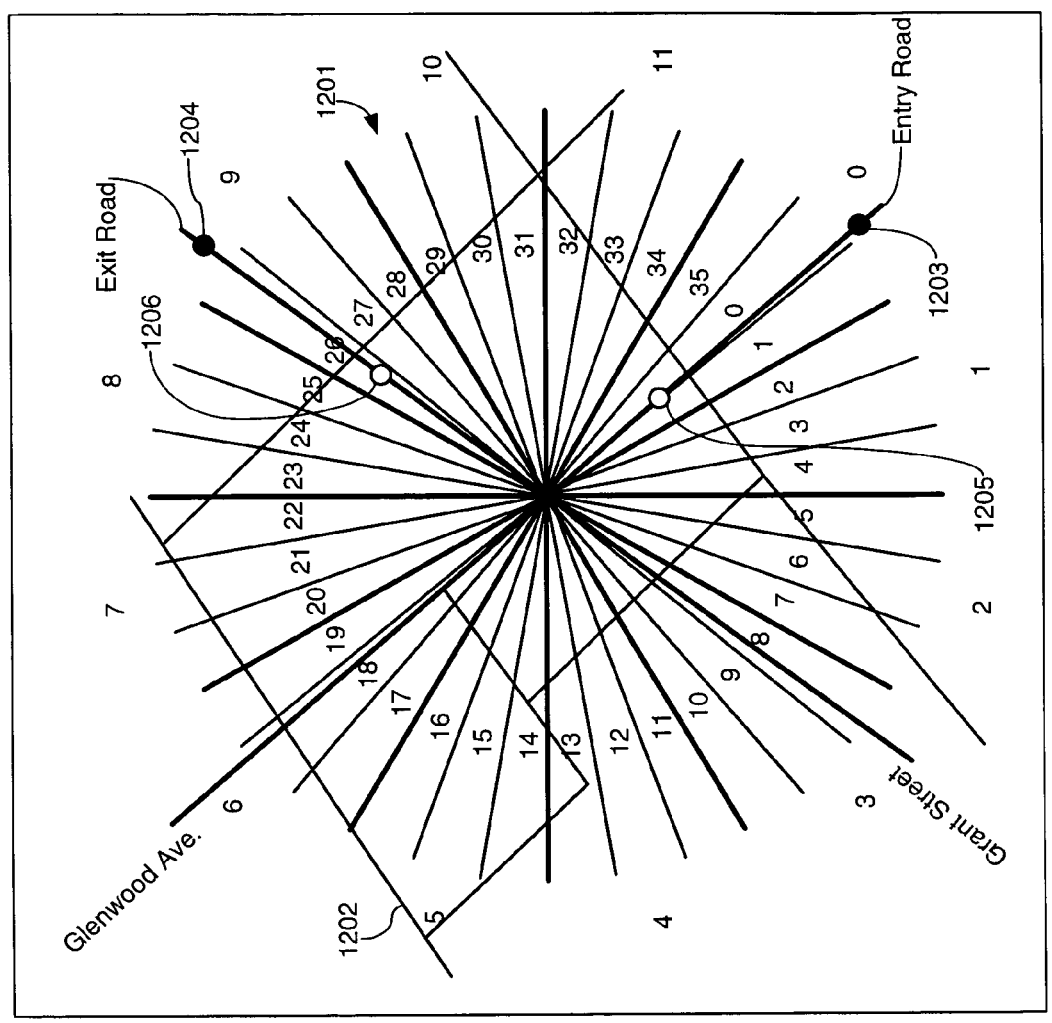
FIG. 12 illustrates an application of the method of the invention to a four-way intersection.

Referring now to FIG. 12, an exemplary application of the method to a real intersection is described. FIG. 12 illustrates the radial grid 1201 mapped atop a network of roads 1202. Entry point 1203 and exit point 1204 are shown, as are the scaled entry and exit points 1205 and 1206. (Note that the other points that may be evaluated, including points representing unused entries and exits will be omitted from the discussion here for simplicity. If such points were evaluated, the method would be the same, with the only difference being that unused points would not include an entry/exit flag.) The entry points 1205 and exit points have been derived via the transformation from geometric points, and have been translated such that their origin coincides with the center of the radial grid 1201.

As can be seen, the entry points 1205 fall within first subdivision 0 and second subdivision 0. As such, the microcomputer of the navigational unit selects second subdivision 0 as the entry subdivision. Likewise, the exit points 1206 fall within first subdivision 9 and second subdivision 27. As such, the microcomputer selects second subdivision 27 as the exit subdivision.

Figure 13:
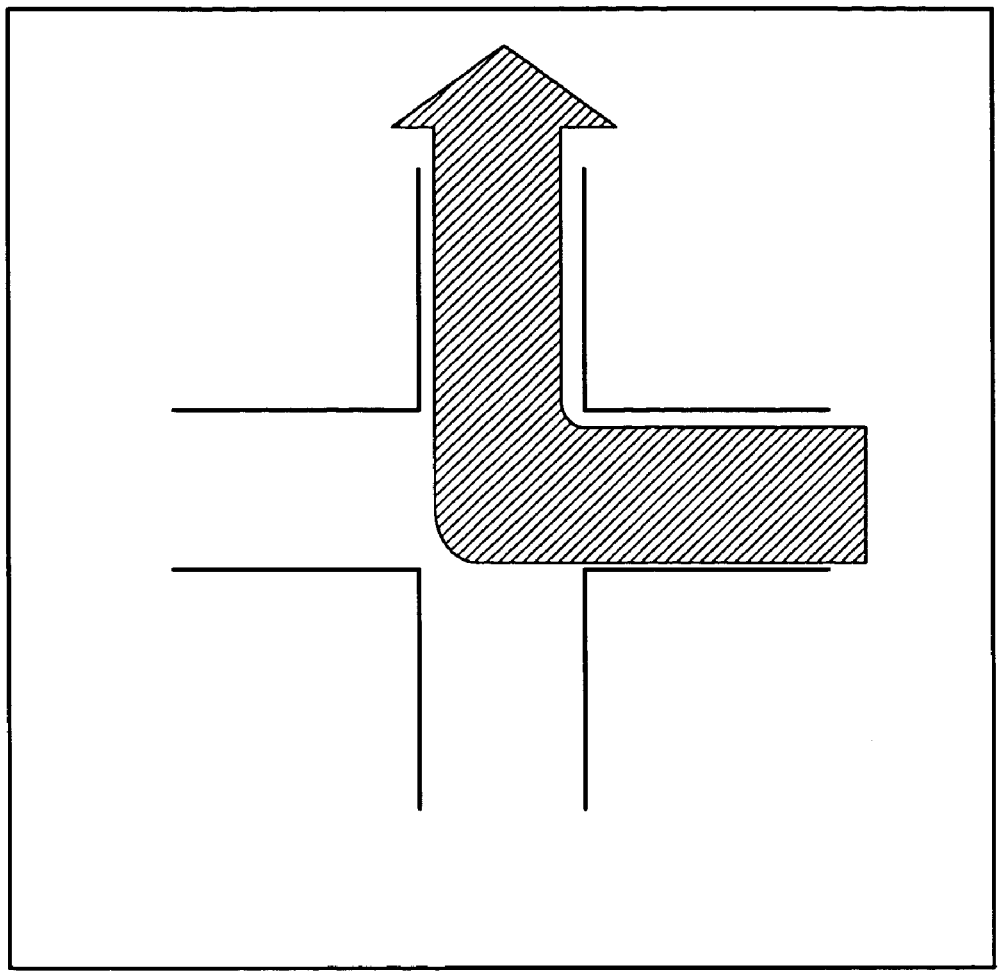
FIG. 13 illustrates a navigational, symbolic description of a maneuver in accordance with the invention.

As the server has transmitted a type code corresponding to a four-way intersection, the microcomputer of the navigational unit selects the four-way intersection description (shown in FIG. 10) from the predetermined set of generic intersection types. Since the microcomputer has selected subdivisions representing the entry and exit, the microcomputer then applies the navigational intersection description to the generic intersection description by drawing a colored arrow running from the entry road to the exit road across the generic intersection description, thereby generating, in real time, a navigational symbolic description of the maneuver. The resultant symbolic description is illustrated in FIG. 13.

Figure 14:
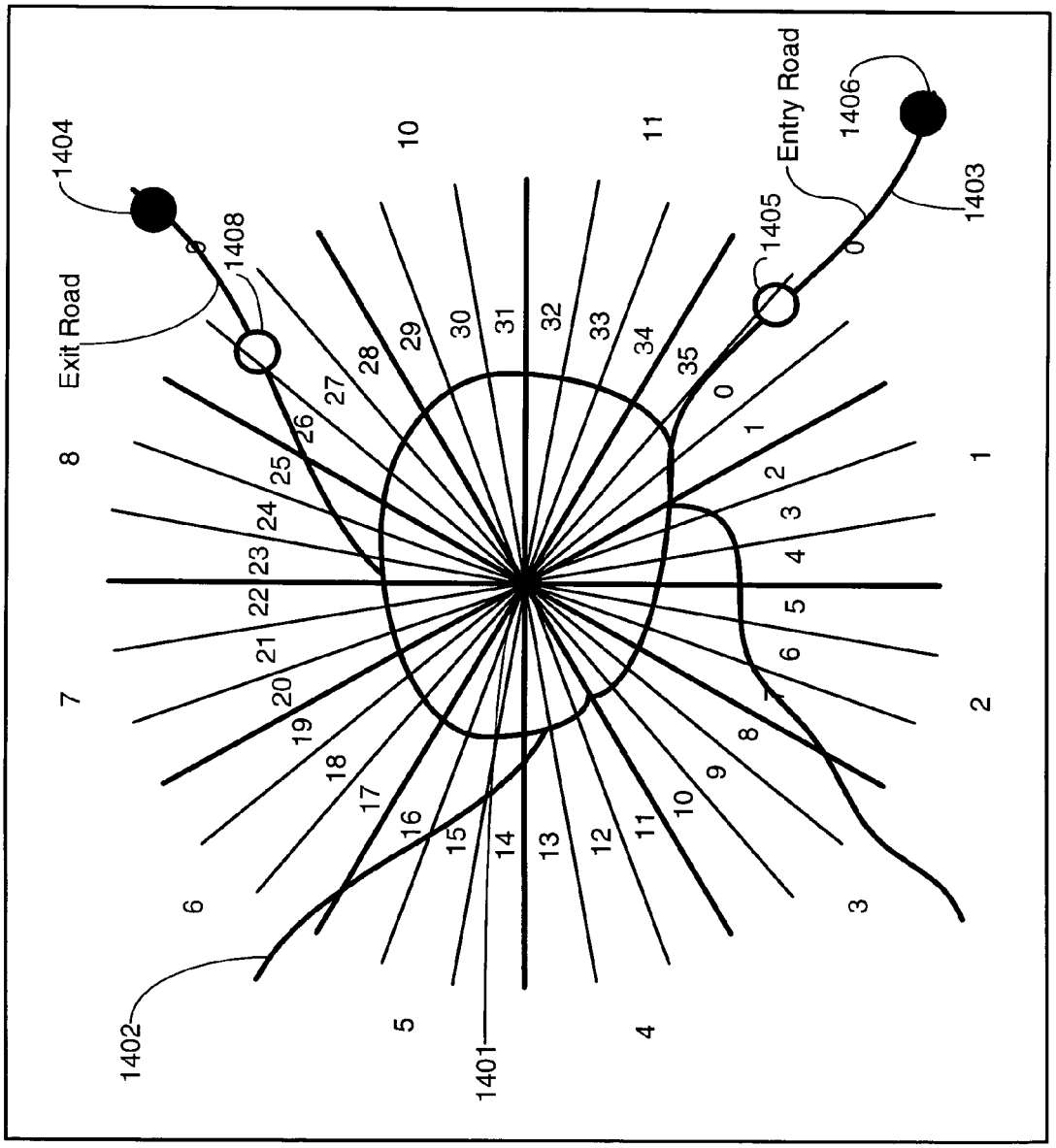
FIG. 14 illustrates an application of the method of the invention to a roundabout.

Referring now to FIG. 14, illustrated therein is the roundabout application. FIG. 14 illustrates the radial grid 1401 mapped atop a network of roads 1402 representing a conventional roundabout. Entry point 1403 and exit point 1404 are shown, as are the scaled entry points 1405 and exit points 1408. The entry points 1405 and exit points 1408 have been derived via the transformation from geometric points, and have been translated such that their origin coincides with the center of the radial grid 1401.

As can be seen, the entry points 1405 fall within first subdivision 0 and within second subdivisions 35, 0 and 1. As such, the microcomputer of the navigational unit selects first subdivision 0 as the entry subdivision, with second subdivision 35 as the higher resolution subdivision due to the fact that the largest number of entry points 1405 fall within second subdivision 35. Likewise, the exit points 1408 fall within predominantly within first subdivision 9 and second subdivision 27. As such, the microcomputer selects first subdivision 9, with second subdivision 27 as the higher resolution exit subdivision.

Figure 15:
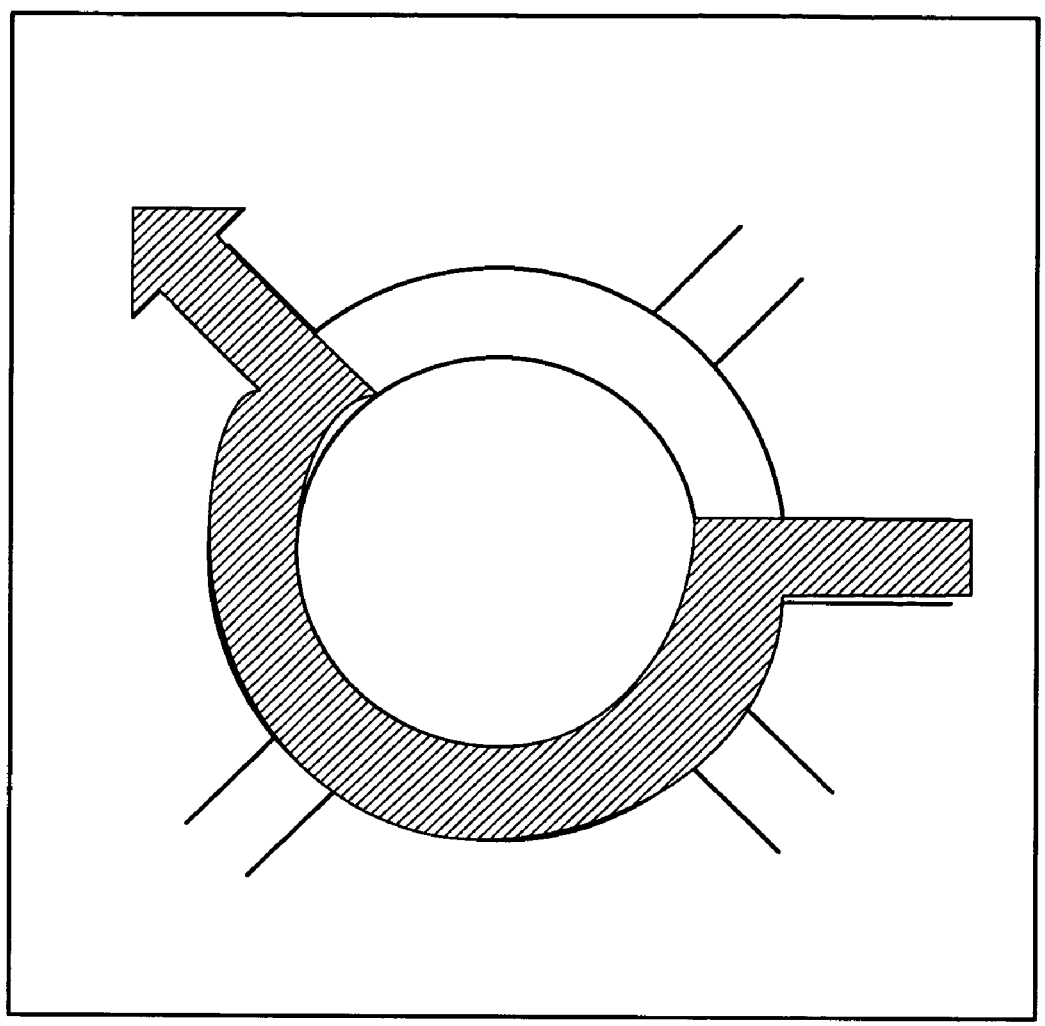
FIG. 15 illustrates a navigational, symbolic description of a maneuver in accordance with the invention.

As with the four-way intersection case, the server has transmitted a type code corresponding to a roundabout. The microcomputer of the navigational unit thus selects the roundabout intersection description (shown in FIG. 11) from the predetermined set of generic intersection types. Since the microcomputer has selected subdivisions representing the entry and exit, the microcomputer then applies the navigational intersection description to the generic intersection description by drawing a colored arrow across the generic intersection description running from the entry road, around the roundabout, to the exit road. The microcomputer has thereby generated, in real time, a navigational symbolic description of the maneuver. The resultant symbolic description is illustrated in FIG. 15.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A method of generating a symbolic description of a navigational element, the method comprising the steps of:
   a. providing a radial grid, the radial grid comprising at least one group of subdivisions, the at least one group of subdivisions comprising a set of partitions extending outward from a center of the radial grid;
   b. providing a plurality of geographic coordinates;
   c. transforming the plurality of geographic coordinates to a plurality of planar coordinates;
   d. mapping the plurality of planar coordinates with the radial grid;
   e. allocating the plurality of planar coordinates to the at least one group of subdivisions;
   f. selecting at least one subdivision from the at least one group of subdivisions as an entry;
   g. selecting at least one subdivision from the at least one group of subdivisions as an exit; and
   h. generating the symbolic description of the navigational element based upon the entry and the exit.

2. The method of claim 1, further comprising the steps of:
   a. providing a type code corresponding to one of a plurality of intersection types;
   b. selecting one symbolic intersection description from a plurality of predetermined symbolic intersection descriptions, the one symbolic intersection description corresponding to the type code; and
   c. applying the one symbolic intersection description to the symbolic description of the navigational element.

3. The method of claim 2, wherein the one of a plurality of intersection types is selected from the group consisting of three-way intersections, four-way intersections, five-way intersections, six-way intersections, and roundabouts.

4. The method of claim 1, wherein the transforming the plurality of geographic coordinates to a plurality of planar coordinates comprises the steps of:
   a. selecting at least two coordinates from the plurality of geographic coordinates;
   b. calculating a scaling factor for a first of the at least two geographic coordinates;
   c. calculating a scaling factor for a second of the at least two geographic coordinates; and
   d. translating the first and second of the at least two geographic coordinates to an origin of a two dimensional coordinate system.

5. The method of claim 1, wherein the symbolic description of the navigational element comprises at least one arrow for conveying to a user where to enter and exit the navigational element.

6. The method of claim 1, wherein the at least one group of subdivisions comprises a first group of subdivisions having between 1 and 36 subdivisions.

7. The method of claim 6, wherein the at least one group of subdivisions comprises a second group of subdivisions having between 3 and 112 subdivisions.

8. The method of claim 7, further comprising the step of correlating the center of the radial grid with the origin of the two dimensional coordinate system.

9. The method of claim 8, wherein the allocating the plurality of planar coordinates to the at least one group of subdivisions comprises counting the number of planar coordinates located within the at least one group of subdivisions and selecting the subdivision with the greatest number of planar coordinates located therein.

10. An apparatus for generating a symbolic description of a navigational element, comprising:
    a. at least one wireless communication device;
    b. a microcomputer coupled to the at least one wireless communication device;
    c. an output device coupled to the microcomputer; and
    d. a memory for storing data, the memory being coupled to the microcomputer;
        wherein the memory comprises:
            i. a plurality of registers containing data corresponding to a radial grid, the radial grid comprising at least one group of subdivisions;
            ii. a plurality of registers containing data corresponding to a plurality of geographic coordinates; and
            iii. a plurality of registers containing data corresponding to a plurality of predetermined symbolic intersection descriptions,
        wherein the microcomputer executes a program comprising the steps of:
            i. transforming the plurality of geographic coordinates to a plurality of planar coordinates;
            ii. mapping the plurality of planar coordinates with the radial grid;
            iii. allocating the plurality of planar coordinates to the at least one group of subdivisions;
            iv. selecting at least one subdivision from the at least one group of subdivisions as an entry;
            v. selecting at least one subdivision from the at least one group of subdivisions as an exit; and
            vi. generating the symbolic description of the navigational element based upon the entry and the exit.

11. The apparatus of claim 10, wherein the program further comprises the step of displaying the symbolic description on the output device so as to be read by a user.

12. The apparatus of claim 10, wherein the apparatus is selected from the group consisting of in-vehicle navigation units, cellular telephones, and PDAs.

13. The apparatus of claim 10, further comprising a global positioning system module coupled to the microcomputer.

14. A method of generating a symbolic description of a route maneuver, the method comprising the steps of:
    a. providing a radial grid, the radial grid comprising at least one groups of subdivisions, the at least one group of subdivisions comprising a set of partitions extending outward from a center of the radial grid;
    b. providing a plurality of two-dimensional coordinates, the two dimensional coordinates corresponding to a route through an intersection;
    c. mapping the plurality of two-dimensional coordinates with the radial grid;
    d. allocating the plurality of two-dimensional coordinates to the at least one group of subdivisions;
    e. selecting at least one subdivision from the at least one group of subdivisions as an entry into the intersection;
    f. selecting at least one subdivision from the at least one group of subdivisions as an exit from the intersection; and
    g. generating a symbolic description of the entry and exit.

15. The method of claim 14, further comprising the steps of:
    a. providing a type code corresponding to one of a plurality of intersection types;
    b. selecting one symbolic intersection description from a plurality of predetermined symbolic intersection descriptions, the one symbolic intersection description corresponding to the type code; and c. applying the one symbolic intersection description to the symbolic description of the entry and exit.

16. The method of claim 15, wherein the one of a plurality of intersection types is selected from the group consisting of three-way intersections, four-way intersections, five-way intersections, six-way intersections, and roundabouts.

* * * * *